June 21, 1949.    R. M. LACEY    2,474,055
IMAGE COPYING PROJECTION MACHINE
Filed June 15, 1948    3 Sheets-Sheet 2
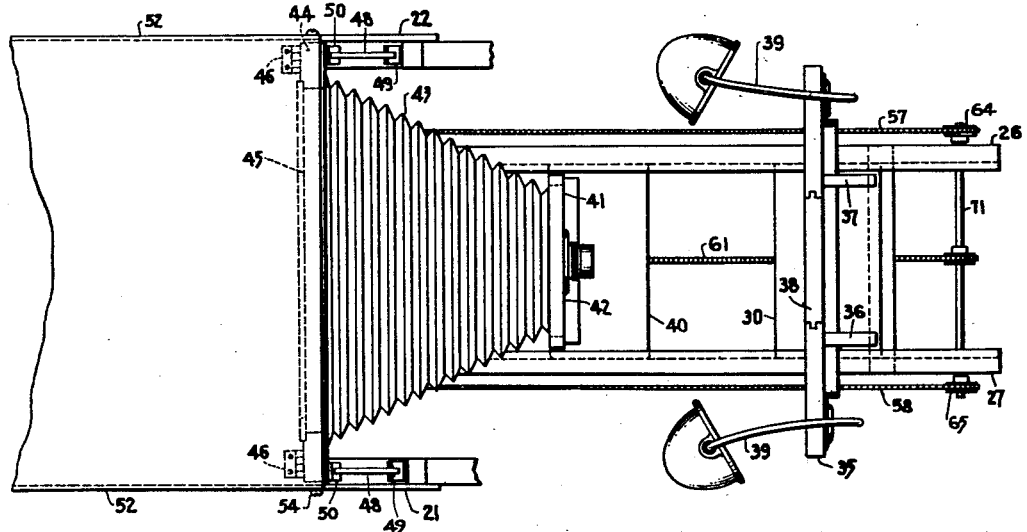
Fig. 3.
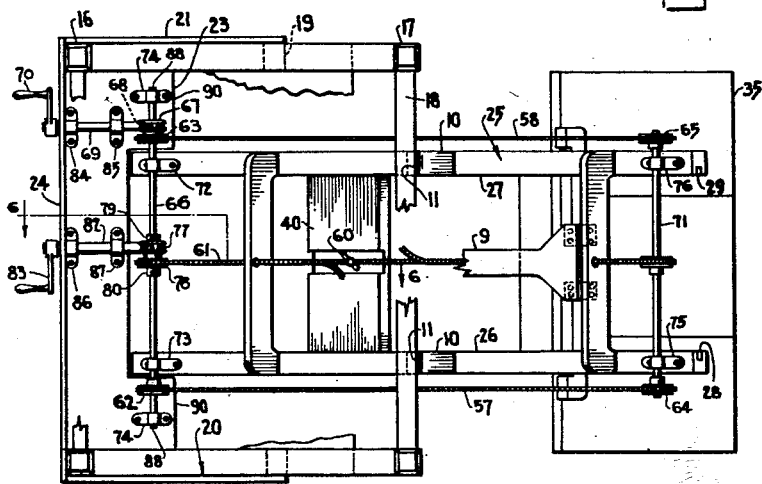
Fig. 4.
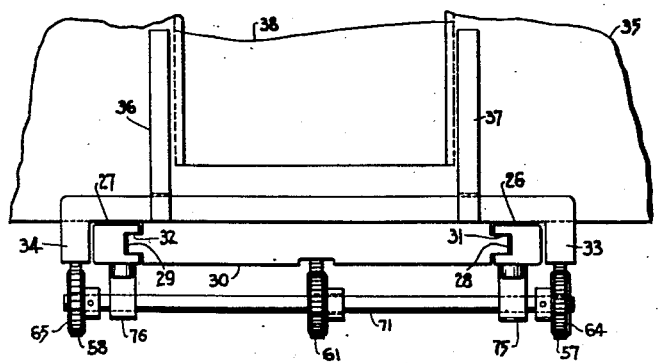
Fig. 5.
INVENTOR
ROBERT MERRITT LACEY.
BY 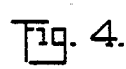
ATTORNEY June 21, 1949.　　　R. M. LACEY　　　2,474,055
IMAGE COPYING PROJECTION MACHINE
Filed June 15, 1948　　　3 Sheets—Sheet 3
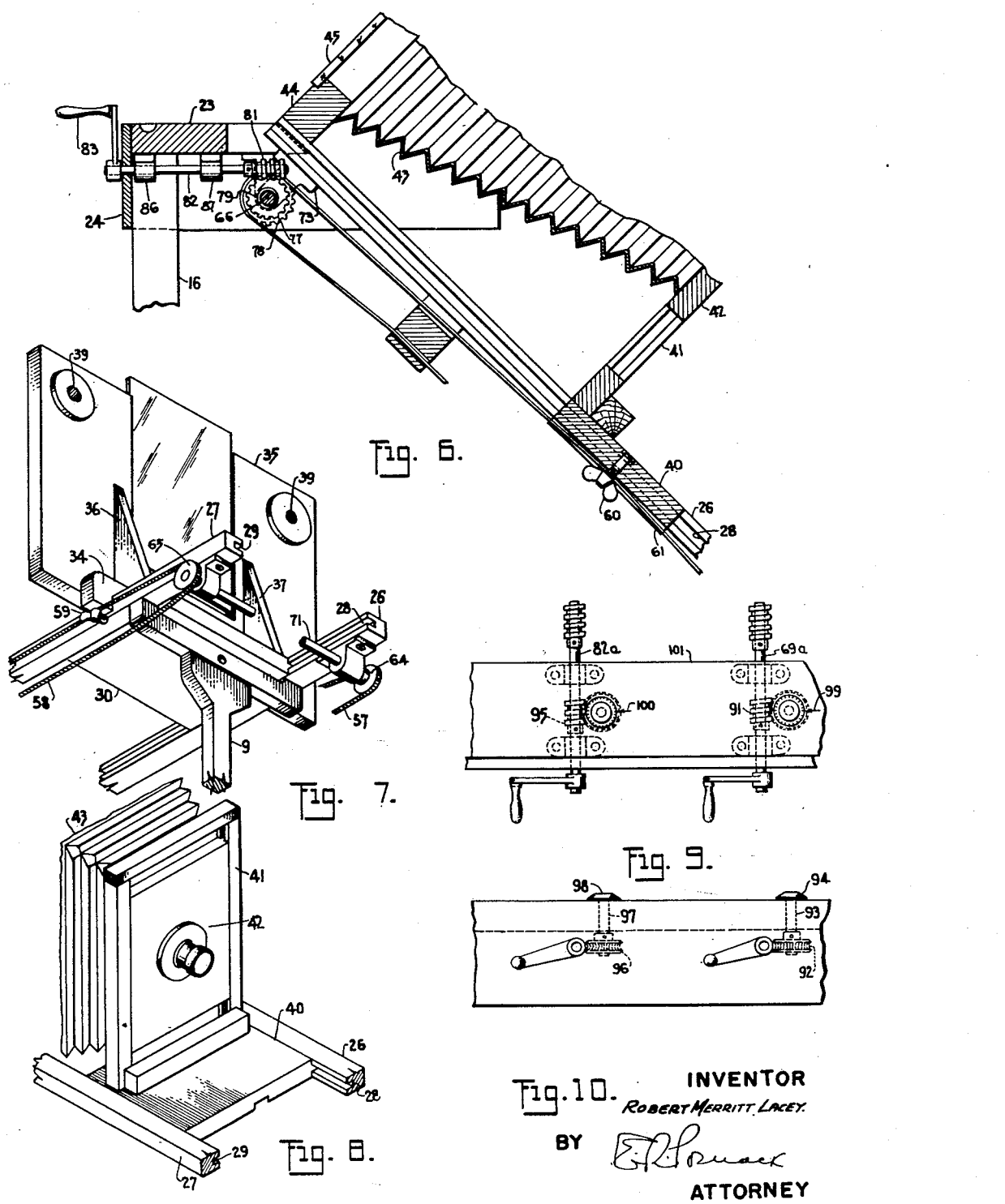
INVENTOR
ROBERT MERRITT LACEY.
BY
ATTORNEY

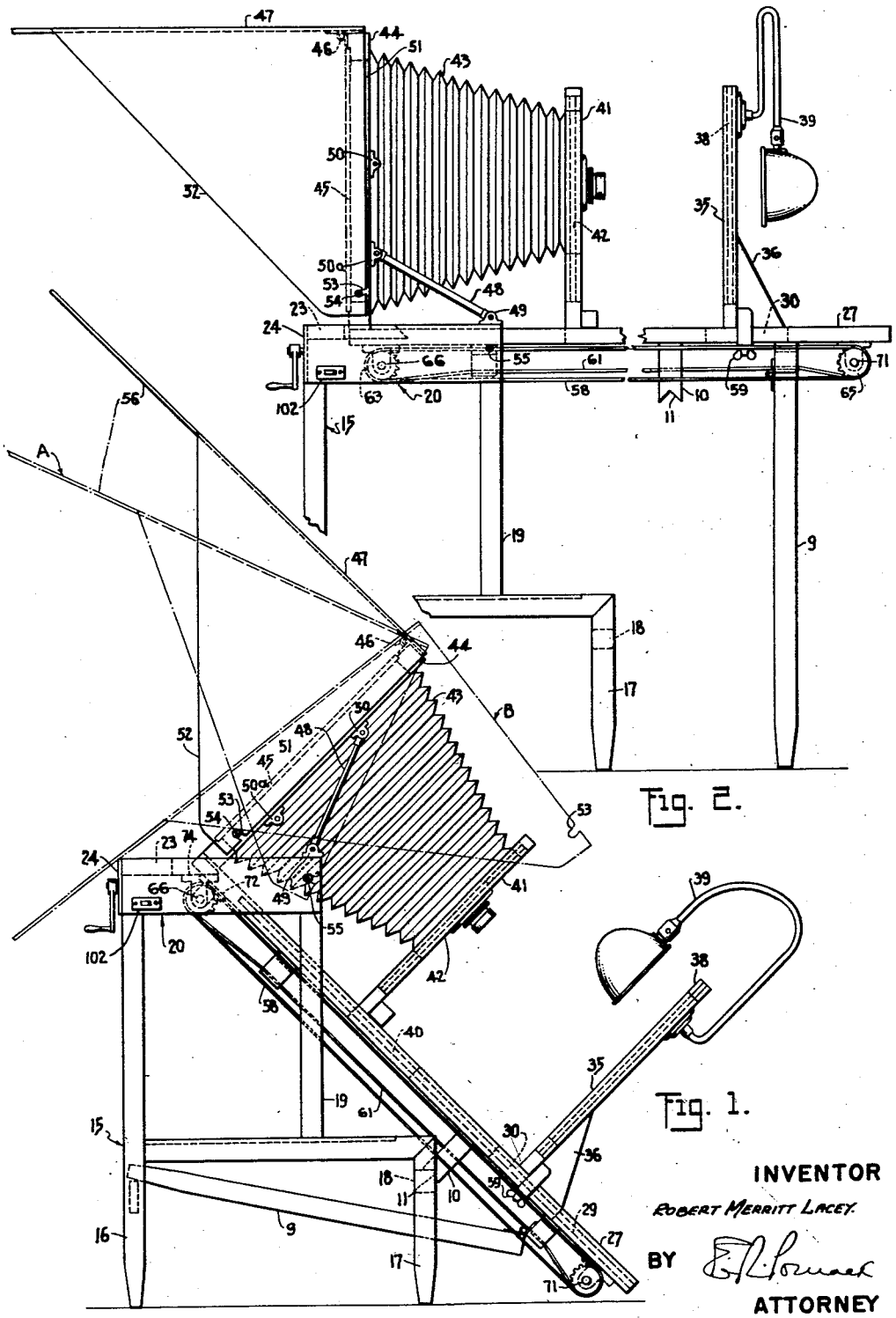

Patented June 21, 1949

2,474,055

UNITED STATES PATENT OFFICE 2,474,055

IMAGE COPYING PROJECTION MACHINE

Robert Merritt Lacey, West Orange, N. J., assignor to The Merritt Lacey Corporation, New York, N. Y., a corporation of New York Application June 15, 1948, Serial No. 33,111

14 Claims. (Cl. 88—24)

1

This invention relates to camera lucida machines, more particularly to devices for copying or tracing the image of a picture or a model.

It is primarily within the contemplation of this invention to provide a device of the above-mentioned category particularly adapted for use in advertising art studios and elsewhere where tracings of pictures and copies of physical models must be made, and capable of ready manual manipulation for projecting an image of the picture or model upon a light-transmitting working easel, and for adjusting the device to obtain sharply projected images of predetermined enlarged or reduced proportions.

It is a further object of this invention to enable an operator or artist to operatively employ this device for making copies as aforesaid while seated on a chair, with the working easel protected against unwanted exterior light sources. And in this last-mentioned aspect of my invention, it is an object to employ a hood adapted to shield the working easel, as aforesaid, and also to form a protective covering for the working parts of the device when not in use.

Still another object of this invention is to provide manually operated transmission means for obtaining relative movements of the camera lens and object easel, with the danger of inadvertently unfocusing the projected image reduced to a minimum.

Another object is to provide conveniently accessible manually manipulable handles for selectively actuating either or both the object lens and object easel, for focusing purposes.

Still another object of this invention is to provide an object easel capable of supporting thereon opaque or transparent pictures, or of permitting an image to be formed on the working easel of a model placed beyond the object easel. And another object is to enable a wide easel to be employed with actuating devices on opposite lateral sides thereof, whereby the plane of said object easel may at all times be maintained parallel to the plane of the object lens.

Other objects, features and advantages will appear from the drawings and the description hereinafter given.

Referring to the drawings,

Figure 1 is a side view of a preferred form of my invention, showing the device in its inclined operative position.

Figure 2 is a fragmentary view like Fig. 1, showing the device in its raised or horizontal position.

Figure 3 is a top view of Fig. 2, the lights being

2 shown directed at the working face of the easel.

Figure 4 is a bottom view of Fig. 1.

Figure 5 is a fragmentary front view of the device, shown looking towards the camera.

Figure 6 is a fragmentary side sectional view of the device, the section being taken substantially along line 6—6 of Fig. 4.

Figure 7 is a fragmentary perspective view of the forward portion of the device, showing a glass panel in place.

Figure 8 is a perspective view of the lens carrier portion of the device.

Figure 9 is a fragmentary plan view of the rear portion of the device, showing a modification of my invention, and Figure 10 is a rear view of Fig. 9.

The device consists of a stand 15 containing, in the preferred form illustrated, two rear legs 16, two relatively short front legs 17 supporting therebetween a cross bar 18, and two intermediate legs 19, said legs 16 and 19 supporting the U-shaped frame 20 consisting of the two lateral members 21 and 22, the rear cross member 23 and the back skirt 24, the front of said frame 20 being open for reasons which will hereinafter appear.

Pivotally mounted upon said frame 20 in a manner to be more fully hereinafter described is the track structure 25 containing the two spaced parallel runners or tracks 26 and 27 each containing underneath thereof the rests 10 the undersurface 11 of which is adapted for resting engagement upon the said cross bar 18 when the said track structure is in its lowermost inclined position, as illustrated in Fig. 1. Said track structure 25 is movable from said lowermost position to the horizontal position shown in Fig. 2, whereby said tracks 26 and 27 are disposed between the sides 21 and 22 of frame 20, and parallel thereto, said tracks extending forwardly beyond the front opening of said U-shaped frame 20, and supported in said position by pivotal leg 9 in obvious manner.

The said tracks 26 and 27 are provided, in the form of my invention illustrated, with inner longitudinal grooves 28 and 29 respectively. Disposed upon the forward portion of the track structure 25 is the object easel carrier 30 containing the lateral beads or extensions 31 and 32 extending into and in slidable engagement with said grooves 28 and 29, respectively. The said carrier is also provided with the guide members 33 and 34 overhanging and in slidable engagement with the outer lateral surfaces of tracks 26 and 27. Mounted upon the carrier 30 is the object easel 35 supported in upright position by the two spaced brackets 36 and 37.

In the preferred form of the easel illustrated, there is a panel 38 slidably inserted within the framework of easel 35, said panel being shown as forming a continuous wall with member 35, whereby it may receive a flat sheet of paper containing the picture to be copied. However, instead of an opaque or solid member 38, a transparent panel may be inserted within member 35, whereby it may operatively support colored or other transparencies. Attached to the lateral sides of the object easel 35 are the light fixtures 39 adapted to throw light upon the operative surface of said object easel.

Also slidably mounted upon the said two tracks 26 and 27, in the manner aforesaid, is the lens carrier 40, operatively supporting the upright lens-supporting structure 41, the object lens mounting 42, with a suitable optical system, being supported so that its plane is parallel to that of object easel 35. To the rear of the object lens is the camera bellows 43 the rear portion of which is attached to the peripheral frame 44 of the transparent working easel 45. It is preferred that the said bellows extend for the full width and height of said working easel 45, so as not to cut off any portion of an image. The brackets 48 pivotally support the frame 44, the brackets each containing lower pivotal supports 49 resting upon the lateral sides 21 and 22 of the U-shaped frame 20. The upper pivotal supports for the brackets being at 50 when the device is in its inclined position (Fig. 1) and 50a when in its horizontal position (Fig. 2).

The hood 47 is pivotally supported upon frame 44 by hinges 46. In the operative position shown in full lines in Fig. 1, the forward edges 51 of the lateral sides 52 of the hood have their notched portions 53 in engagement with the pins 54, whereby the hood is maintained against detachment. Should it be desired to move the hood to the position shown by dot-dash lines A in said Fig. 1, the relatively flexible walls 52 are detached from pins 54, and the hood moved forwardly until the notched portions engage the pins 55. And should it be desired to fully cover the bellows 43 and the underlying parts, the said hood is pivotally swung to the dot-dash position B shown in said Fig. 1.

In the full position shown in Fig. 1 as well as in the dot-dash position A shown therein, the shield 56, extending rearwardly, aids in keeping out unwanted light and undesirable shadows on the transparent working easel 45, and yet, the rear opening is sufficiently large to permit convenient room for working upon said easel 45. The proportions of the hood are such that it can readily envelop the bellows 43, in the manner shown by dot-dash position B.

The object easel carrier 30 and the lens carrier 40 are both movable by means of sprocket chains attached thereto, said chains being operable through manually manipulable handles at the rear of the device. In the preferred form of my invention illustrated, the relatively wide object easel 35, which must at all times be maintained in parallel relation to lens 42, is moved through the action of the two endless sprocket chains 57 and 58, the upper sections of said chains being attached to the underside of the object easel carrier 30 by fasteners, such as the wing nuts 59, so that upon an operative movement of said sprocket chains 57 and 58, the said object easel carrier 30 will be moved longitudinally with respect to the track structure 25. The medial portion of the lens carrier 40 is also attached by wing nut fastener 60 to the central sprocket chain 61, so that upon an operative movement of said central sprocket chain, the lens carrier 40 will similarly be longitudinally moved with respect to track structure 25.

The lateral sprocket chains 57 and 58 are operatively mounted over the rear sprockets 62 and 63, respectively, and the front sprockets 64 and 65, respectively. The said rear sprockets 62 and 63 are affixed to the rear transverse sprocket shaft 66 upon which is fixedly mounted the worm wheel 67 operated by the worm 68 attached to lateral handle shaft 69 extending rearwardly beyond the skirt 24, the outer terminal thereof having mounted thereupon the handle 70. The forward sprockets 64 and 65 are fixedly mounted upon the terminals of the transverse front shaft 71. Rear transverse shaft 66 is rotatably supported by bearings 72, 73 and 74; and the front transverse shaft 71 is rotatably supported by bearings 75 and 76.

Loosely mounted over rear transverse shaft 66 is the central worm wheel 77 to which is attached the sprocket 78, also loosely mounted over said shaft 66, the collars 79 and 80 holding worm wheel 77 and sprocket 78 against lateral movement with respect to shaft 66. Operatively connected to worm wheel 77 is the worm 81 attached to central handle shaft 82 extending rearwardly through said skirt 24, and having at the rearmost terminal thereof the handle 83. Shafts 66 and 82 are supported by bearings 84, 85, and 86, 87, respectively.

It is apparent that upon an operative rotation of handle 83, the lens carrier 40 can be manipulated forwardly and rearwardly; and similarly, an operative rotation of handle 70 will cause a forward or rearward movement of the object easel 35. And since worms and wheels are employed, there is considerably less likelihood of an unfocusing of the device due to backlash or inadvertent manipulation.

The shaft 66 is extended laterally so that terminal portions 88 thereof are rotatably supported by the bearings 74 mounted upon the extension 90 of transverse frame member 23. This provides a pivot for the track structure 25, permitting an up and down pivotal movement in the manner above described. It is important, in order to permit such pivotal movement without disrupting the other mechanism hereinabove referred to, that the axis of such pivotal movement coincides with the axis of the worm wheels, which is effectuated by using shaft 66 as a pivoting means for the said track structure 25.

In the operation of this device, an object, picture or other matter to be copied is placed upon or attached to the object easel 35, and a piece of lay-out paper is placed upon the transparent working easel 45. When the lights on fixtures 39 are turned on by switch 102, an image is projected by the lens system at 42 upon the working easel 45. The type of lay-out paper and the intensity of the lights at 39 are selected so as to permit the said image on the working easel 45 to be seen through the back of the said lay-out paper. When the said image is brought sharply into focus, it may readily be copied or traced on said paper.

Should it be desired to copy the image of an object placed beyond the plane of the object easel 35, the panel 38 can be slidably removed, thereby exposing the object or model to the lens at 42. Upon the use of an optical system of suitable focal length, the image of the model can be clearly projected upon the working easel 45, and focused thereon sharply in the manner aforesaid.

For ordinary copy work, such as when a picture is mounted upon object easel 35, the track structure 25 is in the inclined position shown in Fig. 1, substantially (although not necessarily) 45° to the horizontal. This will not only enable a person to be comfortably seated behind the device, but will also provide a convenient inclined working surface on the working easel. Should it be desired to copy an object beyond the plane of the object easel 35 by removing the panel 38 as aforesaid, the track structure 25 is raised into its horizontal position shown in Fig. 2, and the object to be copied placed substantially at the horizontal level of the lens 42.

In the normal operative procedure, the focusing is effectuated by an operative movement of the lens carrier 40 (through handle 83); and the size of the image on the working easel 45 is effectuated by operatively moving the easel carrier 30 (through the medium of handle 70). Thus, any enlargement or reduction of the image can be obtained, within the limits of the device, by an operative movement of said carrier 30. Figures 9 and 10 illustrate a method of correctly predetermining the relative positions of the object easel 35 and the lens 42. In this modification of my invention, the lateral handle shaft 69a (controlling the position of the object easel 35) contains a worm 91 in engagement with the worm wheel 92, the latter carrying the shaft 93 upon the upper terminal of which is mounted the graduated dial 94. Similarly, the central handle shaft 82a contains a worm 95 in engagement with worm wheel 96, the latter having the shaft 97 with its terminal carrying the graduated dial 98. Markers 99 and 100 on the upper transverse panel 101 cooperate with said dials 94 and 98 respectively, the graduations on said dials being such as to control the relative positions of the lens carrier 40 and the object easel carrier 30 for predetermined enlargements or reductions.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. In a device of the class described, a substantially U-shaped horizontal frame having two side members and one rear transverse member, a support for the frame, a track structure pivotally mounted at the rear of said frame and extending forwardly therefrom, said structure being operatively movable between predetermined upper and lower limiting positions, an object easel extending upwardly from and slidably movable longitudinally relative to the track structure, an object lens in facing relation to said easel and movable longitudinally relative to the track structure, a transparent working easel mounted over said frame and spaced rearwardly from said lens, a camera bellows operatively connecting said lens and working easel, and separate manually manipulable transmitting mechanisms for operatively moving said object easel and said lens relative to said track structure.

2. In a device of the class described, the combination according to claim 1, said support having a cross bar below the front opening of said U-shaped frame, said track structure being adapted when in its said lower limiting position to rest upon the cross bar.

3. In a device of the class described, the combination according to claim 1, said support having a cross bar below the front opening of said U-shaped frame, said track structure having on the underside thereof a downwardly extending rest member adapted to rest upon the cross bar when the track structure is in said lower limiting position, the track structure, when in its upper limiting position, being substantially horizontally disposed and positioned between the two side members of the U-shaped frame.

4. In a device of the class described, the combination according to claim 1, further provided with a lens carrier and an object easel carrier, longitudinally extending sprocket chains attached to said carriers, front and rear sprocket wheels carrying said chains, and rear worm and wheel assemblies operatively associated with the rear sprocket wheels.

5. In a device of the class described, the combination according to claim 4, the pivotal axis of the track structure being coincident with the rear worm axis.

6. In a device of the class described, the combination according to claim 5, further provided with front and rear transverse shafts carrying said front and rear sprocket wheels, and front and rear bearings for said shafts, the rear shafts being operatively supported by bearings attached to said U-shaped frame and separate bearings attached to said track structure.

7. In a device of the class described, the combination according to claim 6, the track structure comprising two spaced parallel tracks, the lens and object easel carriers being slidably movable along said tracks, the said frame-attached bearings being in engagement with the opposite terminal portions of the rear transverse shaft, the rear track structure bearings being attached to the undersides of said two tracks and disposed intermediate the said frame-attached bearings.

8. In a device of the class described, a substantially U-shaped horizontal frame having two side members and one rear transverse member, a support for the frame, a track structure comprising two spaced parallel tracks, an object easel, an object lens in facing relation to said easel, separate object easel and lens carriers slidably movable along said tracks, a transparent working easel mounted over said frame and spaced rearwardly from said lens, a camera bellows operatively connecting said lens and working easel, two laterally opposite longitudinal sprocket chains attached to the object easel carrier, one central sprocket chain attached to the lens carrier, front and rear sprocket wheels carrying said chains, rear worm and wheel assemblies operatively associated with the rear sprocket wheels, and rotatable crank members operatively connected to said rear worms.

9. In a device of the class described, the combination according to claim 8, further provided with front and rear transverse shafts rotatably mounted on said track structure and carrying said front and rear sprocket wheels, the said rear shaft carrying also the wheels of said rear worm and wheel assemblies, the front and rear sprocket wheels associated with said central sprocket chain being loosely mounted over said shafts.

10. In a device of the class described, the combination according to claim 9, the said rear transverse member of the U-shaped frame having thereon a rear skirt disposed behind rear transverse shaft, said crank members having manually manipulable handles disposed exteriorly and rearwardly of the skirt.

11. In a device of the class described, the combination according to claim 8, further provided with a hood member having two lateral walls and one upper wall disposed respectively laterally of and above said working easel.

12. In a device of the class described, the combination according to claim 11, said lateral walls being flexible and being pivotally mounted upon the said side members of the U-shaped frame.

13. In a device of the class described, the combination according to claim 8, the tracks containing inner longitudinal grooved portions in facing relation, said carriers having lateral extensions in slidable engagement with said grooved portions, the said object easel carrier having two lateral guide elements overhanging the two tracks and in slidable engagement with the outer lateral surfaces thereof.

14. In a device of the class described, the combination according to claim 8, said crank members each having a handle shaft and operatively connected thereto a rotatably mounted dial, graduated markings on the dials, and pointers on the U-shaped member operatively associated with said dials.

ROBERT MERRITT LACEY.

REFERENCES CITED

The following references are of record in the file of this patent:

UNITED STATES PATENTS

| Number | Name | Date |
|---|---|---|
| 704,379 | Robertson et al. | July 8, 1902 |
| 1,270,896 | Farquhar | Sept. 17, 1913 |
| 1,306,861 | Sparkes | June 17, 1919 |
| 1,597,595 | Jones | Aug. 24, 1926 |
| 1,604,765 | Caps | Oct. 26, 1926 |
| 1,911,142 | Cahill | May 23, 1933 |
| 2,341,042 | Hill | Feb. 8, 1944 |